Figure 1:
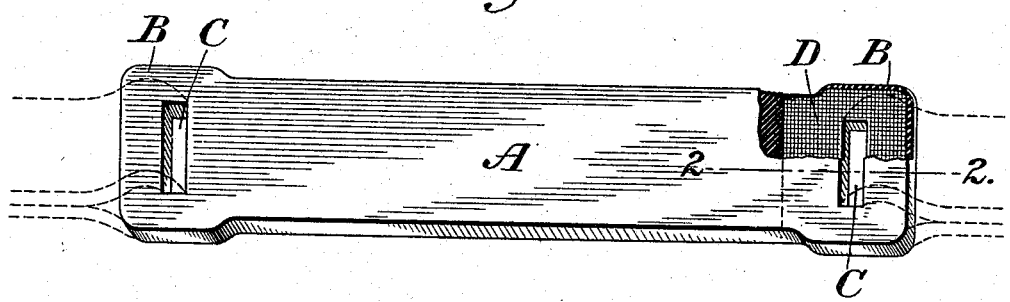

J. J. SHEA.
ELASTIC CONNECTING STRAP.
APPLICATION FILED JULY 3, 1908.

941,659.

Patented Nov. 30, 1909.

Witnesses:
A. N. Jesberg.
H. Richard Wobse

Inventor
John J. Shea
By his Attorney
Ernest Hopkinson

UNITED STATES PATENT OFFICE.

JOHN J. SHEA, OF HARTFORD, CONNECTICUT, ASSIGNOR TO THE HARTFORD RUBBER WORKS COMPANY, A CORPORATION OF CONNECTICUT.

ELASTIC CONNECTING-STRAP.

941,659.      Specification of Letters Patent.      Patented Nov. 30, 1909.

Application filed July 3, 1908. Serial No. 441,753.

*To all whom it may concern:*

Be it known that I, JOHN J. SHEA, a citizen of the United States, residing in the city of Hartford, county of Hartford, and State of Connecticut, have invented a new and useful Improvement in Elastic Connecting-Straps, of which the following is a specification.

The present invention relates to devices for providing an elastic element in a strap for securing the hood or bonnet of an automobile and for other purposes.

In first-class automobiles it is customary to make the bonnet or hood covering the engine hinged at the center, so that either side may be lifted to expose the working parts underneath, and the hinged portions of the bonnet are secured to the frame-work of the machine by any suitable securing devices. In order to serve as an additional securing device it is customary to provide a strap which is secured on opposite sides of the hood, the ends being secured by buckling. This not only serves as an additional securing device, but when buckled tightly serves as an anti-rattler. It often happens that it is difficult to get the proper tension upon the strap or belt to serve this function.

In the drawings I have illustrated a construction embodying my invention, in which—

Figure 2:
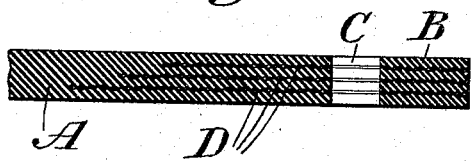

Figure 1 is a perspective view partly broken away. Fig. 2 is a section along the line 2—2 of Fig. 1.

In the drawings like letters of reference refer to like parts.

Referring to these drawings in detail, A represents a piece of elastic rubber of suitable width, thickness and strength, having enlarged end portions B provided with openings C through which the strap is designed to pass. The end sections of the belt are reinforced preferably by layers of canvas D, the several plies of which are of varying lengths in order to graduate the reinforcement so that the variation between the strong, practically inelastic end portions and the highly elastic central portion which consists only of rubber, shall be graduated.

What is claimed as new is;

A connecting strap consisting of a rubber strip having an elastic middle portion and end portions reinforced by layers of fabric of varying lengths.

In testimony whereof, I have signed my name in the presence of two subscribing witnesses.

JOHN J. SHEA.

Witnesses:
    ERNEST A. HALL,
    J. D. ANDERSON.